United States Patent [19]

Mortensen

[11] Patent Number: 4,615,799
[45] Date of Patent: Oct. 7, 1986

[54] WATER PURIFICATION AND STERILIZATION SYSTEM

[75] Inventor: Jorgen G. Mortensen, Kowloon, Hong Kong

[73] Assignee: J. Mortensen & Company Limited, Kowloon, Hong Kong

[21] Appl. No.: 729,393

[22] Filed: May 1, 1985

[51] Int. Cl.[4] ............................................... C02F 1/32
[52] U.S. Cl. .................................... 210/117; 210/192; 210/232; 250/436; 250/438; 422/24
[58] Field of Search .............. 210/764, 192, 243, 748, 210/282, 232, 96.1, 117; 422/24; 250/431, 436, 438, 435

[56] References Cited

U.S. PATENT DOCUMENTS

| | | | |
|---|---|---|---|
| 3,456,107 | 7/1969 | Robertson | 250/436 |
| 4,101,777 | 7/1978 | Reid | 250/436 |
| 4,141,830 | 2/1979 | Last | 210/192 |
| 4,151,085 | 4/1979 | Malik | 422/24 |
| 4,322,291 | 3/1982 | Ho | 250/438 |

FOREIGN PATENT DOCUMENTS

| | | | |
|---|---|---|---|
| 3011817 | 10/1980 | Fed. Rep. of Germany | 422/24 |
| 1459395 | 12/1976 | United Kingdom | 422/24 |

Primary Examiner—Benoit Castel
Attorney, Agent, or Firm—Charmasson & Holz

[57] ABSTRACT

A device for filtering and sterilizing potable water for household use which may be connected in the water line at a faucet or ahead of the automatic ice-making mechanism of a refrigerator. The water is purified in two stages: The first stage uses an activated carbon filter to remove solid particles, dissolved gases and colloidal particles from the water; the second state uses intensive ultraviolet radiation provided by a mercury vapor lamp to kill essentially all bacteria, viruses and any other organisms which are not trapped by the activated carbon filter. The lamp is mounted concentrically within a cylindrical tube having a water inlet at one end and an outlet at the other end, so that the water is sterilized as it passes through the annular chamber defined by the lamp and the outer wall of the cylindrical tube. A solenoid-activated shut-off valve cuts off the water flow from the device whenever a control circuit detects a failure of the lamp or a loss of line power. The filtering and sterilization process does not remove essential minerals from the water, an advantage of this device over distillation-based systems.

2 Claims, 5 Drawing Figures 4,615,799

WATER PURIFICATION AND STERILIZATION SYSTEM

FIELD OF THE INVENTION

The present invention relates to devices for purifying water through the use of filtering and sterilization techniques.

BACKGROUND OF THE INVENTION

Numerous means for purifying drinking water have been heretofore disclosed. In U.S. Pat. No. 2,738,427, a method is disclosed for reducing bacteria count in water by exposing it to ionizing ultraviolet radiation. An ultraviolet-radiation-emitting tube is mounted in a cylindrical chamber, the interior walls of which are highly reflective. Water is then cycled back and forth within the chamber in pipes having transparent walls. A 1978 U.S. Pat. No., 4,066,551, utilizes ultraviolet radiation in combination with an activated charcoal filter to purify water. In that particular application, an ultraviolet light is simply placed above the water reservoir.

SUMMARY OF THE INVENTION

The primary object of the present invention is to provide a compact, efficient, easily-manufactured and fully-integrated device for purifying water from a pressurized water line utilizing both sterilization and filtration processes.

Another objective of this invention is to provide a simpler, more efficient design for an ultraviolet-radiation-based sterilization chamber.

A further objective of this invention is to provide a means for shutting off the water flow through the purification device in the event the ultraviolet-radiation source should cease functioning (e.g. in the event the power should fail or the ultraviolet-emitting source should fail).

DESCRIPTION OF THE PREFERRED EMBODIMENT OF THE INVENTION

Figure 1:
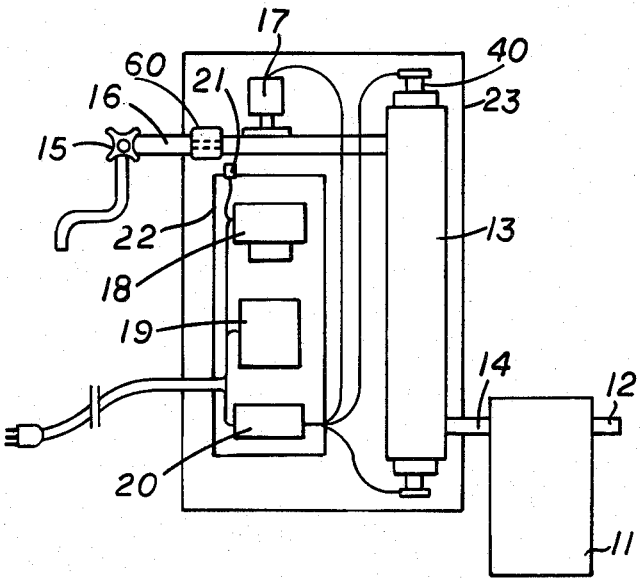
FIG. 1 is a block diagram of the water purification system.

Referring now to FIG. 1, unpurified water under pressure enters filter canister 11 through filter inlet 12. Filtered water passes from canister 11 to sterilization chamber 13 through connector line 14. As the water travels through chamber 13, it is irradiated by ionizing ultraviolet radiation. Filtered, sterilized water then travels to faucet 15 through outlet line 16. In certain applications (i.e. where the system is used to purify water used by the automatic ice-making mechanism of a refrigerator), faucet 15 may be eliminated entirely. Solenoid-actuated valve 17 cuts off the flow of water through outlet line 16 when no ultraviolet radiation is being produced in chamber 13 (e.g. when the ultraviolet source burns out or the power to the ultraviolet source fails). Ballast transformer 18 provides power for the ultraviolet radiation source. Relay 19 performs the switching function for solenoid-actuated valve 17. A start switch and terminal bus comprise lower module 20. Indicator light 21 warns of a burned-out ultraviolet source. Ballast 18, relay 19 and lower module 20 are consumer non-serviceable components and are housed in a secondary housing 22. Chamber 13, solenoid-actuated valve 17, and the greater part of outlet line 16 are located within primary housing 23.

Figures 2, 3, 4:
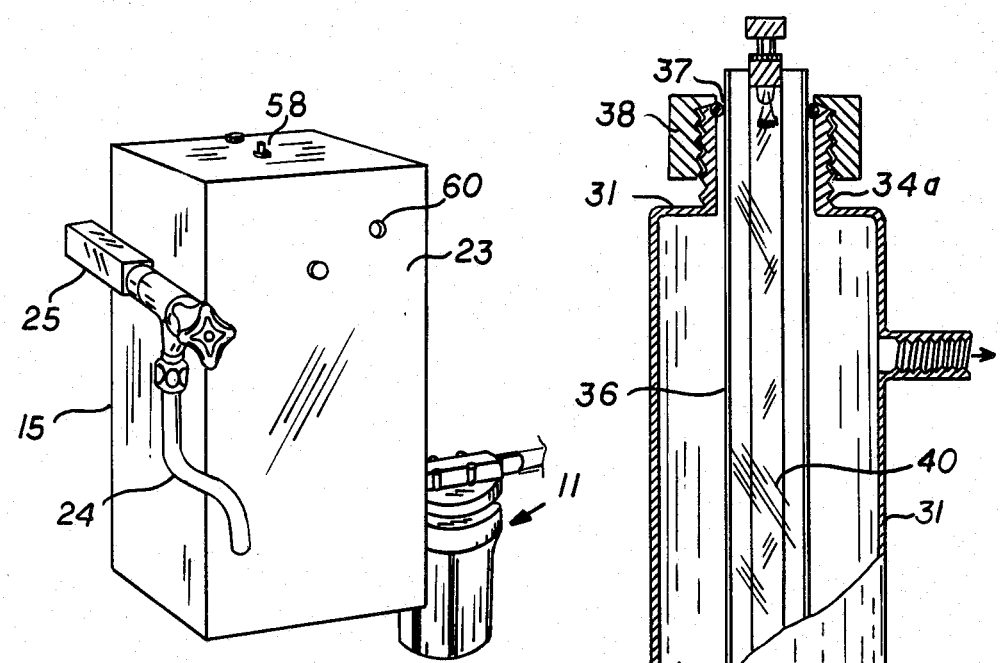
FIG. 2 is a perspective view of the water purification system.
FIG. 3 is a partial cross-sectional view of the sterilization chamber.
FIG. 4 is a cut-away view of the filtration chamber.

Referring now to FIG. 2, the rectangular shape of primary housing 23 is a clearly visible, as is the exterior detail of filter chamber 11. Faucet 15 has a swivelable spout 24. Outlet line 16 and faucet 15 are interconnected by mounting block 25 which is firmly secured to primary housing 23.

Referring now to FIG. 3, the outer cylindrical wall 31 and the end caps 32 and 33 of sterilization chamber 13 are formed from a single stainless steel tube in a stamping operation. Mounting nipples 34a and 34b are welded to end caps 32 and 33 respectively so that said mounting nipples are concentric with cylindrical wall 31. A transparent glass tube 36 is installed through said mounting nipples and sealed at each end of chamber 13 by means of an O-ring 37 which is compressed between glass tube 36 and mounting nipple 34 by compression nut 38. An annular chamber 39 is thus formed. Mercury vapor tube 40 is mounted within glass tube 36. A mounting bracket 41 is affixed to the cylindrical wall at each end of sterilization chamber 13.

Referring now to FIG. 4, a cut-away view of filter canister 11, filter housing 42 is threaded to receive threaded canister cap 43. Filter O-ring 44 is compressed between cap 42 and housing 43, forming a water-tight seal. Cylindrical cartridge filter element 45 has a hollow cylindrical core 46 and impermeable end plates 47. Hollow core 46 is sealed from the outer filtration surface by means of housing pedestal 48 and outlet port extension 49. Inlet port 50 ducts unfiltered water to outer filtration surface of filter element 45. The water is filtered as it seeps through a fibrous layer 51, then through a layer of activated charcoal 52 and finally through another fibrous layer 53. Filtered water collects in hollow core 46 and flows into outlet port 54 through the outlet port extension 49. Relief valve 55 may be depressed to check for the presence of water pressure in the line.

Figure 5:
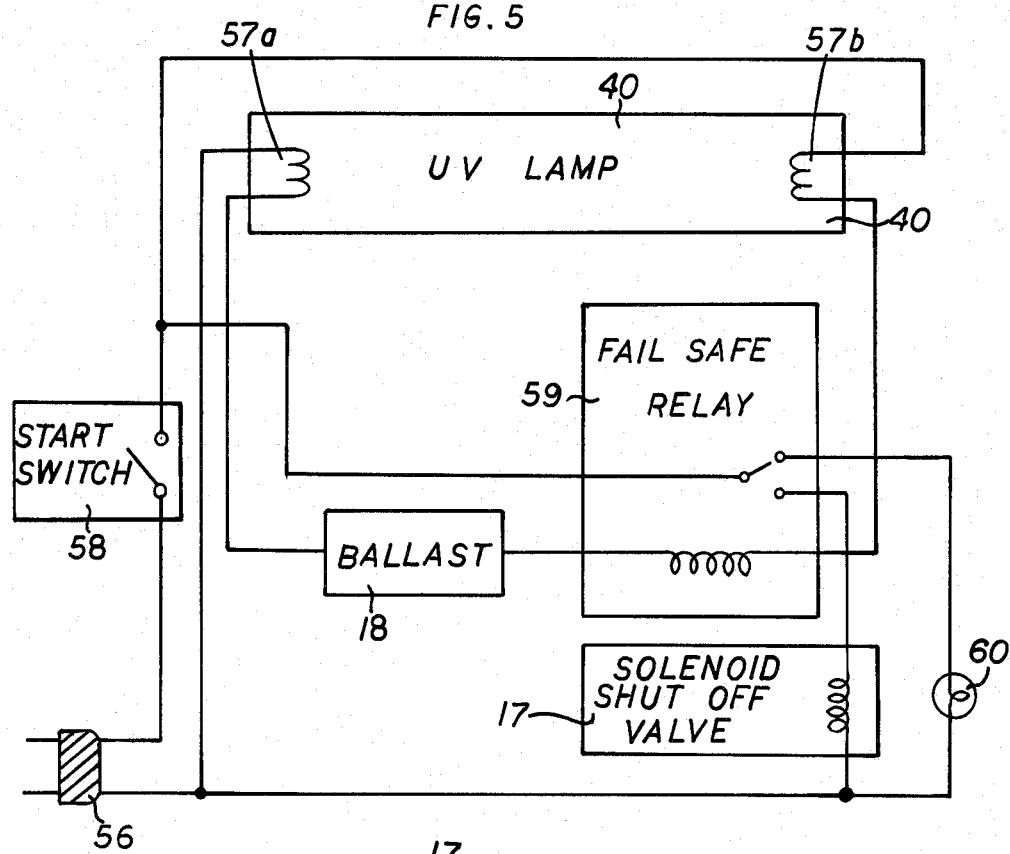
FIG. 5 is block diagram of the automatic shut-off circuit.

Referring now to the circuit diagram of FIG. 5, power line input is through connector 56. Heating elements 57a and 57b, located at the ends of mercury vapor tube 40, are connected in series with ballast 18. Ballast 18 provides a momentarily higher-than-normal voltage to heating elements 57a and 57b when start switch 58 is closed. Solenoid-actuated valve 17 is in a normally closed state, thus blocking flow of water through outlet line 16 when voltage is not applied to the solenoid. Voltage is applied to solenoid only when a complete circuit exists through the ballast 18 and relay 59 is actuated. In its non-actuated state, relay 59 provides a current path for indicator light 60, which warns of an open circuit such as would occur if the mercury vapor tube were to burn out.

Depending upon the type of faucet 15 and outlet used, it might be necessary to install a flow control unit to prevent an excessive flow of water through the device beyond the capacity of the filter and sterilization unit. In some applications, the outside filter cannister 11 may not be necessary if the water is already free of solid particles.

While the preferred embodiment of the invention has been described, other embodiments may be devised and modifications may be made thereto without departing from the spirit of the invention and the scope of the appended claims.

What is claimed is:

1. In combination with a pressurized water system, a water purifier comprising:
   a filter canister comprising a filter inlet, and containing a replaceable filter element, in which water under pressure can be received, through said filter inlet, filtered through said filter element and expelled;
   an ultraviolet irradiation chamber for receiving water expelled from said canister;
   conduit means for fluidly connecting said filter canister and ultraviolet irradiation chamber, said received water being exposed to a level of ultraviolet radiation sufficient to kill essentially all living organisms within said water prior to said water being expelled from said chamber;
   said ultraviolet irradiation chamber of a generally annular shape, consisting of:
      an outer cylindrical wall;
      an inner cylindrical wall concentric to said outer cylindrical wall, said inner wall being transparent to ultraviolet radiation;
      a tubular source of ultraviolet radiation mounted concentrically with respect to said outer and inner cylindrical walls;
      water inlet near one end of said annular chamber;
      a water outlet near the other end of said annular chamber; and
      means for sealing the ends of said annular chamber consisting of:
         a circular end cap concentrically and sealingly bonded at each end of said outer cylindrical wall, each end cap having a hole in its center, and each end cap being mounted orthogonally with respect to the cylindrical axes of said inner and outer cylindrical walls;
         an exteriorly-threaded mounting nipple having an interior diameter equal to the hole in the center of each end cap, each nipple sealingly bonded to its respective end cap and projecting longitudinally outward from its respective chamber end, said inner cylindrical wall being slideably installed through both nipples such that the ends of said inner wall extend outwardly from said nipples;
         an O-ring installed circumferentially around the gap between said inner cylindrical wall and said mounting nipple at each end of said chamber; and a nut installed on each nipple, which, when tightened, compress their respective O-rings, forcing said O-rings deeper into said repective gaps, creating a water-tight seal at each end of the chamber between the outer surface of said inner cylindrical wall and the interior cylindrical surface of the respective nipple; and
   means for stopping the flow of water through said water outlet line when ultraviolet radiation is not present in said irradiation chamber, said means for stopping comprising a normally-closed solenoid-actuated valve interposed within said water outlet line, a single-pole relay having a coil connected in series with the tubular source, said solenoid-actuated valve receiving current for opening said water outlet line when current is flowing through said tubular source.

2. The water purifier of claim 1 which further comprises a manually-operated faucet for controlling water flow through said outlet line.

* * * * *